A. VALENZUELA.
AUTOMATIC TRAP FOR RATS, MICE, AND WILD ANIMALS.
APPLICATION FILED DEC. 20, 1916.

1,274,959.

Patented Aug. 6, 1918.
3 SHEETS—SHEET 1.

WITNESSES
E. R. Ruppert
Myron J. Clear

INVENTOR
Alberto Valenzuela
BY Munn & co.
ATTORNEYS

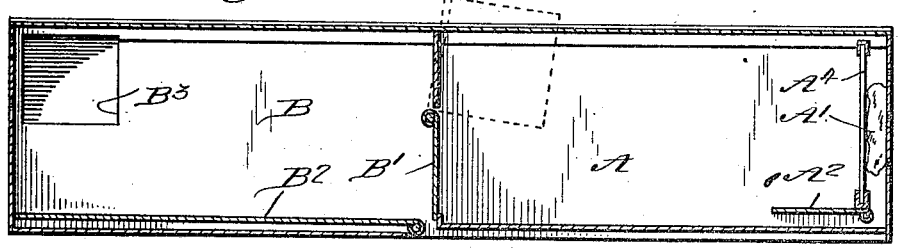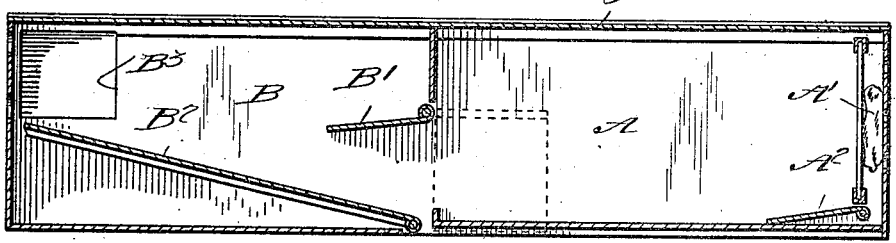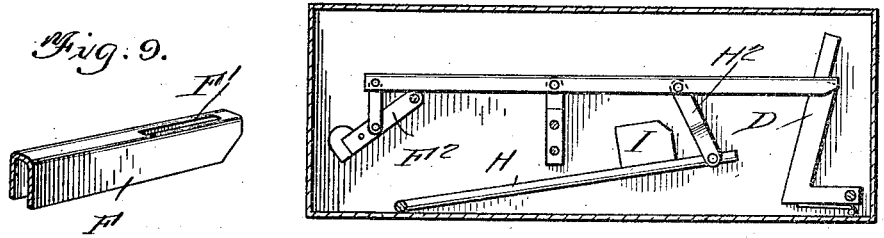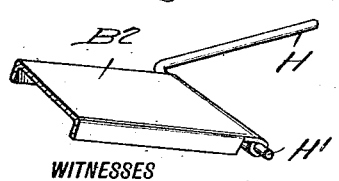

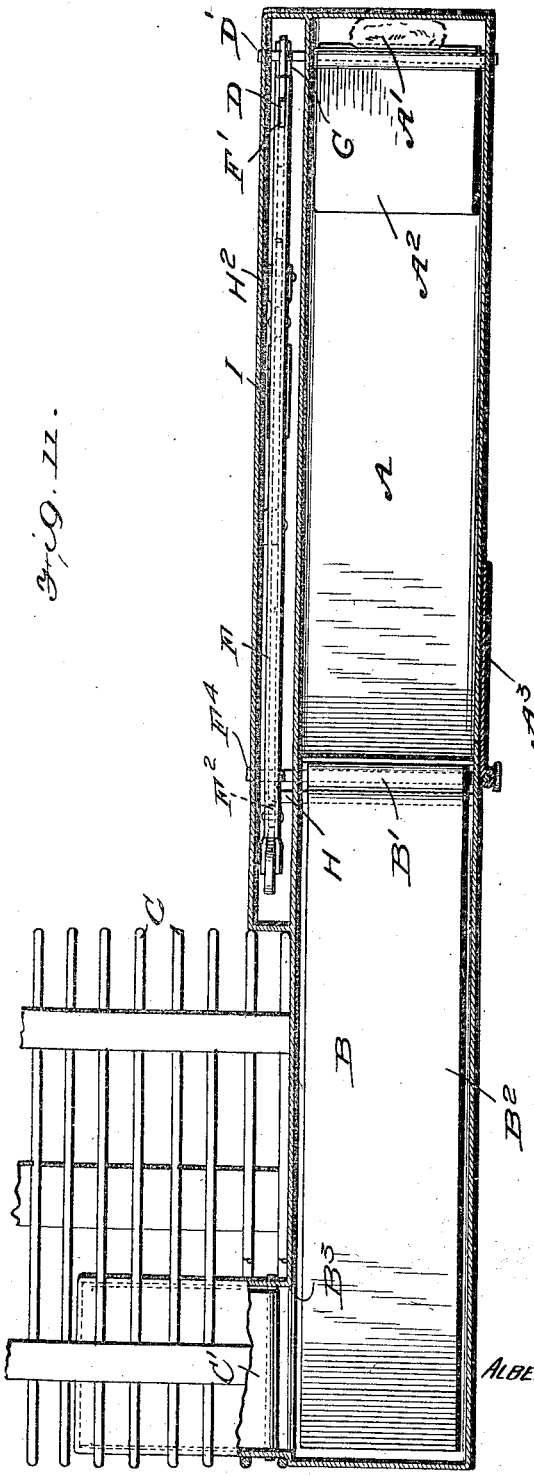

UNITED STATES PATENT OFFICE.

ALBERTO VALENZUELA, OF VALPARAISO, CHILE, ASSIGNOR OF ONE-HALF TO ROBERTO ALFREDO NOBRIGA, OF VALPARAISO, CHILE.

AUTOMATIC TRAP FOR RATS, MICE, AND WILD ANIMALS.

1,274,959.        Specification of Letters Patent.        Patented Aug. 6, 1918.

Application filed December 20, 1916. Serial No. 138,003.

*To all whom it may concern:*

Be it known that I, ALBERTO VALENZUELA, a citizen of Peru, residing at Valparaiso, Province of Valparaiso, Republic of Chile, (whose post-office address is Valparaiso, Chile, P. O. Box Number 708,) have invented a new and useful Automatic Trap for Rats, Mice, and Wild Animals, of which the following is a specification.

My invention relates to improvements in rat catching devices and wild animal traps, which consists of a cage divided into three compartments, the apparatus being particularly described and ascertained in and by the following statement. The objects of my improvement are to secure, first of all a permanent working trap, capable of trapping one after the other a number of rats or wild animals; second, to procure a cheap and effective trap, able to catch rats or wild animals, according to size and resistance of materials employed; third to supply a device able to catch alive the greater possible number of rats and wild animals, at the lesser cost and with the least danger in case of wild beasts.

I attain these objects by the mechanism illustrated in the accompanying drawings, in which:

Fig. 4 is a vertical section taken on line 4—4 of Fig. 1, with the parts in normal set position.

Fig. 5 is a similar view with the parts in adjusted position after the entrance of an animal.

Fig. 6 is a vertical section taken on line 6—6 of Fig. 1 with the parts corresponding in position to the position of parts of Fig. 4.

Fig. 7 is a similar view with the parts corresponding in position to the positions of the parts of Fig. 5.

Fig. 9 is a detail perspective view of certain of the door actuating connections, and Fig. 10 is a detail perspective view of the re-setting platform.

Fig. 11 is a top plan view, with the top removed and the walls in sections to show the relation of the various levers, doors, platforms, etc., as an entirety.

Similar letters refer to similar parts throughout the several views.

Figure 1:
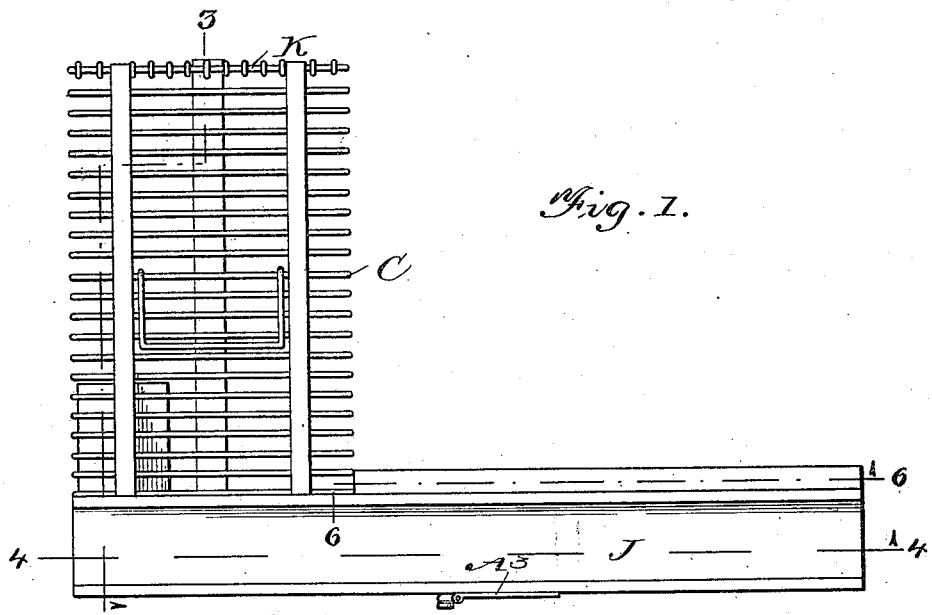
Figure 1 is a top plan view.
Figure 2:
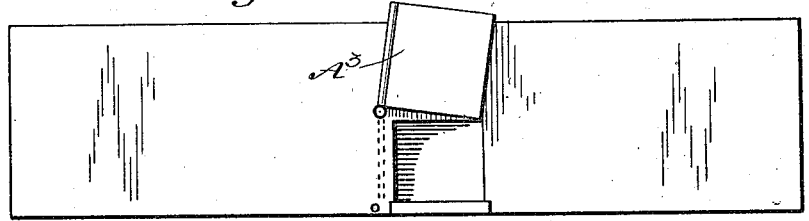
Fig. 2 is a front elevation.

The cage or trap is divided into three different compartments.

1. A reception compartment, or cage A, where the bait A' is placed to attract the rat or wild animal, according to the case. The rodent or wild animal trying to bite the piece of stale cheese or bait acts on a platform $A^2$ with its feet, said platform giving under the weight of the fore-paws of the animal effects a rapid lowering movement of the entrance door $A^3$ to the compartment A through which the animal came in. Simultaneously with the shutting of the entrance door an intermediate door B' is opened automatically which allows the rat or animal entrapped to pass to the second compartment in trying to run away.

2. A central or middle compartment or section B has also a collapsible platform $B^2$ which forms the bottom of the cage and gives under the weight of the animal until it passes to the hole $B^3$. Once the bottom gives the door B' of this compartment closes by itself, opening at the same time the entrance door $A^3$ of the first compartment, leaving thus a free entry to other rodents or wild animals, according to the case.

Instinctively the animal passes from compartment B to compartment C, or deposit, which has a spring door C' that allows the animal to enter but prevents the exit by means of a catch.

As thus described it will be seen that the trap of my invention is automatic and does not require setting except once, as when the animal passes to the third compartment or deposit C the trap becomes set and ready to catch another rodent or wild animal, according to the case, and so on successively.

The third compartment or deposit C may be made of any size desired, increasing or reducing it according to number of animals to be caught.

But the real importance of my invention lies in the fact that the trap may be adapted to any kind of wild animal from the house mouse and rat to the bear and the tiger. It will work the same without interruption whatever the animals to be caught, by simply strengthening the materials, that is to say the bars and plates and increasing dimensions to suitable size. To catch a fox, for instance, a trap proportioned to its bulk will be required, with iron bars and wooden walls and plates of sheet iron, baiting it with a live hen instead of the cheese paring of the rat trap. As the place where the bait is is guarded by a grate A⁴ the same bait will serve to attract all the animals which the deposit may hold.

If the game to be caught is bigger, a tiger or a bear, for instance, a sheep, a goat or a dog may be placed behind the grate as a bait, with sufficient food for several days. The tiger or bear will be attracted by the bleating or barking and unable to touch its prey behind the iron bars of the bait grate will be entrapped just the same as a common rat would in the smaller trap.

I attain these objects by the mechanism illustrated in the accompanying drawings, in which: the mechanism is seen, but not in the model as it is incased between two walls which make it invisible. It consists principally of three levers. The first is a vertical lever D, fastened at its lower end to the platform A² of the first compartment A by means of a pin or hinge D' and moving downward.

When the animal steps on the platform and this descends with the lever D the other end of lever D moves to the right and in doing this sets free from an upper notch F' one of the ends of a second lever F. A small spring G that retains the first lever D in place makes its upper end return always to the left.

Thus, when the platform moves downward with the weight of the rat, the first lever D, fastened to it descends and its free end moves from left to right unclasping from its notch the horizontal lever F whose end (left end) descends.

This second lever F is mounted on a pin or hinge that passes through its middle having thus two ends. The left end has a cut and hooks into the upper notch of the first lever D. The right end carries a link F² connected by means of a second arm F³ to the shaft F⁴ of the doors A³ and B' of the first and second compartment.

This lever F moves up and down impelled by a third lever H, which is connected by means of an arm H' to the platform of the second compartment.

The left end of the lever H is connected by means of a link H² to the second lever, at a distance from its left end equal to one fourth of the total length of said lever. The second lever F ascends and descends with the third lever H (Fig. 1). At its end this lever carries a counterweight I, which makes the mechanism sensible to the slight pressure of the animal to be entrapped.

Figure 3:
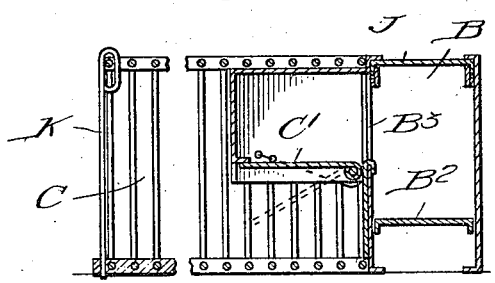
Fig. 3 is a vertical section taken on line 3—3 of Fig. 1.
Figure 8:
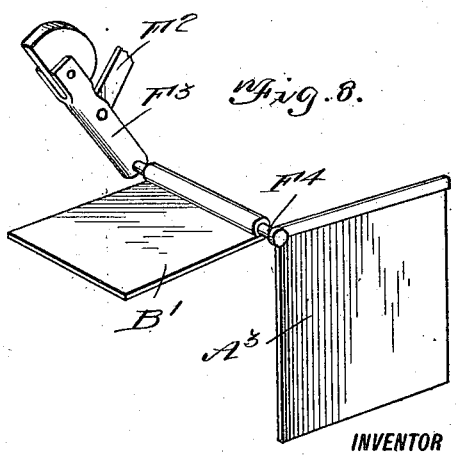
Fig. 8 is a detail perspective view of the entrance door, the intermediate door, and certain of the connections thereof.

To cleanse the bottom of both the first and second compartments they have a lid or cover J which may be lifted and closed or slid in and out, according to arrangement of the lid. (Fig. 3.)

The mechanism of the third compartment is reduced to two doors. The first one C' the entrance, which turns on a horizontal hinge has a spring which tends to maintain the door lifted upward touching a buffer formed by the wall of the entrance. The second door K is the exit or outlet to get or throw out the animals from the deposit or third compartment.

Having thus described and ascertained the nature of my invention, I declare that what I claim and desire to secure by Letters Patent, is:

A trap of the character described, including a casing having an entrance compartment, an intermediate compartment, and a receiving compartment, said entrance compartment having an entrance opening, a normally open door for closing said opening, a bait holder within said entrance compartment, a spring controlled latch member pivotally mounted adjacent one end and provided with an engaging shoulder adjacent its opposite end, a normally closed door between the entrance and intermediate compartments connected to and actuated with the said entrance door to open when the latter is closed, a vertically shiftable platform pivoted within the intermediate compartment and having a controlling rod extending from its pivot at one side and provided with a weight, an intermediately pivoted lever having a slotted end normally engaged by said latch member, and to which said rod is pivotally connected, a weight at the opposite end of said lever, a pivoted platform adjacent the bait holder and connected to said latch member for releasing the latter, and a spring door controlling communication between the intermediate and receiving compartments and opening into the latter, all for the purpose described.

In testimony whereof I have signed my name to this specification in the presence of two subscribing witnesses at Valparaiso, Chile, this eighteenth day of November in the year nineteen hundred and sixteen.

ALBERTO VALENZUELA.

Witnesses:
  T. S. SOTOMAYONY,
  E. ARANCIBIA.